United States Patent [19]
Rzeszewski

[11] Patent Number: 4,672,427
[45] Date of Patent: Jun. 9, 1987

[54] PROCESSING OF ANALOG VIDEO SIGNALS IN DIGITAL TRANSMISSION SYSTEMS

[75] Inventor: Theodore S. Rzeszewski, Lombard, Ill.

[73] Assignees: American Telephone and Telegraph Company; AT&T Bell Laboratories, both of Murray Hill, N.J.

[21] Appl. No.: 700,025

[22] Filed: Feb. 8, 1985

[51] Int. Cl.$^4$ ............................................. H04N 11/06
[52] U.S. Cl. ......................................... 358/13; 358/11; 358/138
[58] Field of Search ....................... 358/11, 12, 13, 31, 358/141, 138

[56] References Cited

U.S. PATENT DOCUMENTS

| | | | |
|---|---|---|---|
| 3,858,240 | 12/1974 | Golding et al. | 358/13 |
| 4,037,248 | 7/1977 | Iijima et al. | 358/13 |
| 4,051,516 | 9/1977 | Weston | 358/11 |
| 4,065,784 | 12/1977 | Rossi | 358/13 |
| 4,227,204 | 10/1980 | Rossi | 358/13 |
| 4,291,331 | 9/1981 | Devereux | 358/13 |
| 4,322,739 | 3/1982 | Drewery et al. | 358/13 |
| 4,419,686 | 12/1983 | Morrison | 358/13 |
| 4,568,966 | 2/1986 | Lippel | 358/13 |

OTHER PUBLICATIONS

V. G. Devereux et al., "Digital Video: sub-Nyquist Sampling of Pal Colour Signals", *Proc.IE*, vol. 125, No. 9 (9-78), pp. 779-786.
G. A. Reitmeier, "The Effects of Analog Filtering on the Picture Quality of Component Digital Television Systems", *SMPTE Journal*, vol. 90, No. 10 (10-81), pp. 949-955.
H. J. Grallert et al., "An Integrated Digital Filter for the Component Encoding of Color TV Signals", *Siemens Forschungs— und Entwicklungsberichte*, vol. 13, No. 5 (1984), pp. 240-245.
J. P. Rossi, "Sub-Nyquist-Encoded PCM NTSC Color Television", *SMPTE Journal*, vol. 85, No. 1, Jan. 1976, pp. 1-6.
R. Turner, "Some Thoughts on Using Comb Filters in the Broadcast Television Transmitter and at the Receiver", *IEEE Transactions on Consumer Electronics*, vol. CE-23, No. 3, Aug. 1977, pp. 248-257.
D. H. Pritchard, "A CCD Comb Filter for Color TV Receiver Picture Enhancement", *RCA Review*, vol. 41, Mar. 1980, pp. 3-28.
D. H. Pritchard, "US Color Television Fundamentals—a Review", *IEEE Transactions on Consumer Electronics*, vol. CE-23, No. 4, Nov. 1977, pp. 467-478.

(List continued on next page.)

*Primary Examiner*—James J. Groody
*Assistant Examiner*—Victor R. Kostak
*Attorney, Agent, or Firm*—David Volejnicek

[57] ABSTRACT

A system (FIGS. 1A-1C) for transmitting analog component video signals (Y, (R-Y), B-Y)) in digital form uses sharp cut-off low-pass filters (104–106) to bandlimit the signals. Chrominance signals are limted to one-half of the 4.2 MHz bandwidth of the luminance signal. Phase equalizers (107–109) are used to compensate for distortion caused by the sharp cut-off filters. Prior to sampling, the chrominance signals are comb-filtered by sharp cut-off comb filters (110–111) in the region where weighted sub-Nyquist sampling will cause spectral interleaving between the baseband spectrum and its replica. The luminance signals are sampled using a sampler (116) that uses a super-Nyquist sampling frequency, while the chrominance signals are sampled using samplers (117–118) that use a weighted sub-Nyquist sampling frequency. The signal samples are passed through digitizers (125, 127, 129), DPCM encoders (126, 128, 130), and a multiplexer (131) prior to being transmitted by a transmitter (132) on a 90 Mbps telephony trunk (150). Signals received at a receiver (200) are passed through a demultiplexer (201) and DPCM decoders (205, 207, 209), and are reconverted to analog form by D/A converters (211-213). The analog signals are filtered by gentle cut-off comb filters (214-216) and low-pass filters (217-219) to remove therefrom replicas of the baseband spectra. Since gentle cut-off filters introduce little phase distortion, no phase equalizers are needed at the receiver.

27 Claims, 22 Drawing Figures

OTHER PUBLICATIONS

D. G. Fink, "Color Fundamentals", *Electronics,* Dec. 1950, part I of a Three-part Series, pp. 88–93, Electronics, Part II of a Three-part Series, Jan. 1951, pp. 78–83, *Electronics, part III of a Three-part Series, Feb. 1951, pp. 104–109.*

D. H. Pritchard et al., "Worldwide Color Television Standards—Similarities and Differences", *SMPTE Journal,* vol. 89, Feb. 1980, pp. 111–120.

T. Tsuboi, et al., "Fiber-Optic HDTV Transmission Technology", SMPTE Journal, Jan. 1985, pp. 4–10.

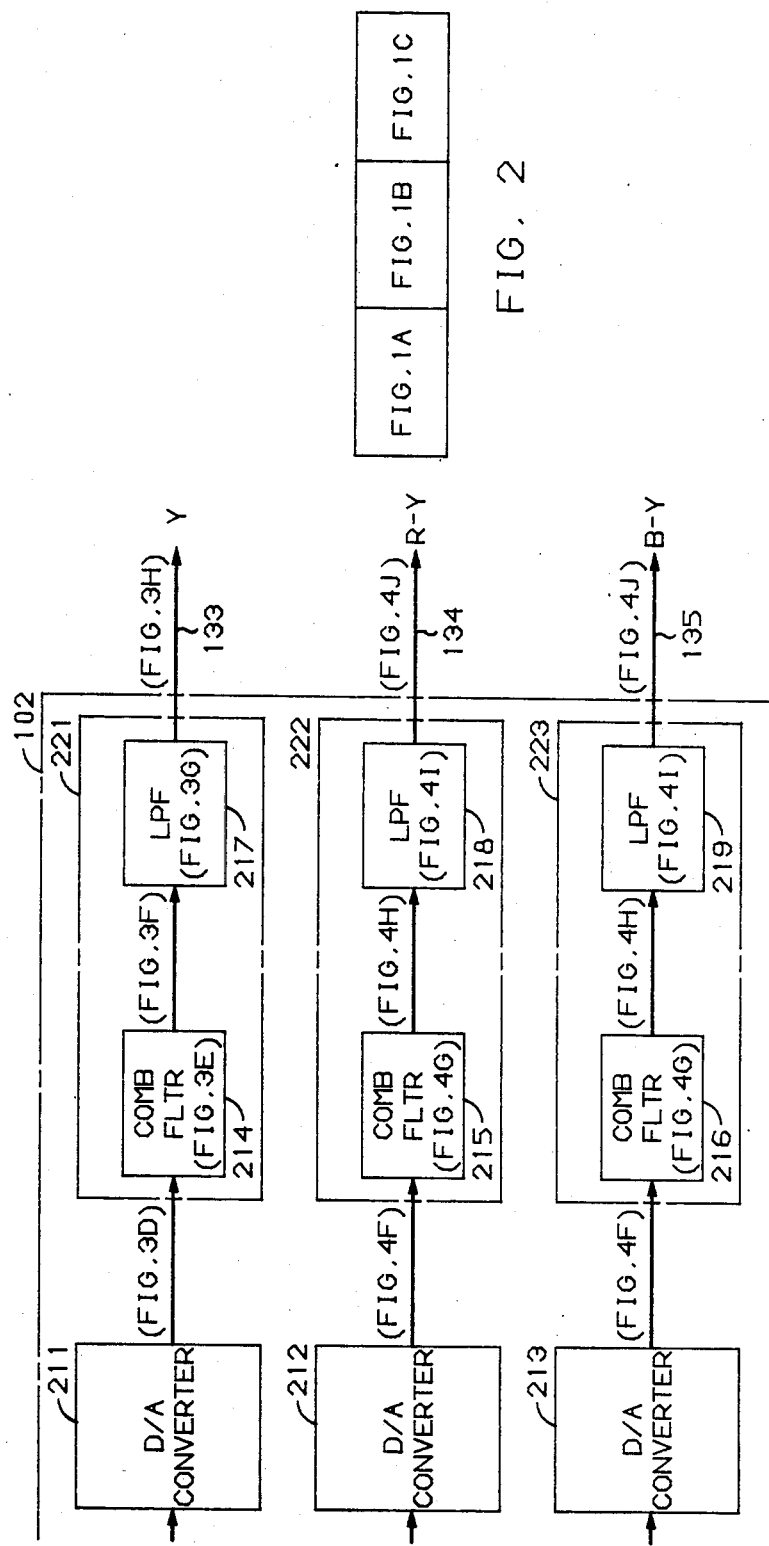

PROCESSING OF ANALOG VIDEO SIGNALS IN DIGITAL TRANSMISSION SYSTEMS

TECHNICAL FIELD

This invention is directed to color video signal transmission in general, and particularly concerns the apparatus for processing for digital transmission, transmission, and reconversion to analog from digital form, of analog high-quality component color video signals.

BACKGROUND OF THE INVENTION

Broadcast color video signals conventionally comprise three component signals: a luminance signal, designated as Y, which carries the image contrast—black and white—information, and two chrominance signals, designated either as I and Q or (R-Y) and (B-Y), which carry the image color information. Composite video, such as the NTSC video signal that is the standard for color television transmissions in North America, combines the three component signals for transmission in analog form by modulating a carrier with both of the chrominance signals in phase-quadrature and then interleaving the combined chrominance signal with the baseband luminance signal. Component video, however, treats the analog baseband luminance and chrominance signals as separate channels and does not combine them for transmission in analog form. Component video produces a higher-quality image than composite video because it avoids crosstalk between the three components that would be introduced by combining them in composite video, and because it can allow for more bandwidth for the chrominance components of the signal than does the NTSC composite video format.

Because digital signal transmissions are less susceptible than analog signal transmissions to noise and other image degradations introduced during transmission, the quality of a received video image can be enhanced further by means of digital video signal distribution. The frequency, or bit rate, required for digital transmission of component video is determined by the sampling rate and bits per sample for each of the luminance and chrominance signals. The sampling rate and the number of bits used per sample are generally directly related to the image resolution and quality. Image quality is thus generally directly related to the transmission bit rate, and hence it is desirable to keep the transmission rate at a maximum. However, conventional transmission facilities are generally limited in the transmission rate that they can handle, and the cost of a transmission facility is generally directly related to the maximum rate that it can handle. Hence it is desirable to keep the transmission rate to a minimum.

These conflicting considerations have resulted in numerous techniques and arrangements that have imaginatively sought to reduce the transmission rate without sacrificing greatly the video image quality in the process. An example of such a technique is to greatly limit the bandwidth of chrominance signals—to 0.5 MHz, for example—to reduce the frequency at which the signals need be sampled. This technique, however, leads to excessive distortion of, and lack of resolution in, the image color. Information on color detail is carried at the higher frequencies. Hence the lower is the chrominance bandwidth, the more of the color detail is lost from the image.

Another example is a technique that takes advantage of the periodicity of the video signals' spectrum to reduce the sampling rate, by sampling both the luminance and chrominance signals at sub-Nyquist frequencies. The Nyquist frequency is twice the maximum frequency contained by the signal and theoretically is the lowest frequency at which a given signal may be sampled such that the samples retain all information content of the sampled signal. This technique then uses comb filters to remove aliasing—distortion—spectral components that are introduced into the baseband video signals by sub-Nyquist sampling. While sub-Nyquist sampling is an attractive approach, it, like any compression technique, produces image degradation. For sub-Nyquist sampling, the degradation comes in the form of distortion of diagonal patterns. The amount of distortion of diagonal patterns is directly related to how deeply the combing must extend into the baseband of the video signals to remove the aliasing spectrum. And if the combing is done throughout the video baseband, further degradation comes in the form of reduction in the vertical resolution of the image.

Yet another technique uses expensive band-limiting filters that have a very sharp cutoff of their pass-band region, to minimize the spectral content of the video signals, and then uses as low a super-Nyquist sampling frequency as possible. With this approach, the filter design and realization becomes very complex and expensive. In fact, the design becomes a compromise between cost and complexity of the filters versus the amount of degradation of the image that results from non-ideal filter characteristics. Most of the filters start out with a minimum phase filter design that will meet the selectivity, i.e., steepness of cutoff, requirements imposed by the choice of sampling frequency. But the phase distortion caused by this type of filters is proportional to the selectivity of these filters. Since the required selectivity is high, there is an associated high phase non-linearity, especially in the higher frequency region of the baseband video signals. The phase non-linearity causes a differential delay of the high frequencies, which produces "ringing". Ringing is a very noticeable picture degradation. Hence, the phase distortion introduced by such filters must be minimized, by the addition of phase shift equalization circuitry. However, phase shift equalization typically is difficult to perfect for very sharp cut-off filters, and the circuits needed to realize it are typically costly and complex.

The techniques that were just discussed may have been adequate for transmissions of conventional color television images, in spite of the fact that they result in some amount of image degradation. However, none of these techniques alone are satisfactory for transmissions, at rates compatible with conventional transmission media, of high-quality component video images or images such as those that are required for High Definition Television (HDTV). The degradation of image quality produced by known arrangements using these techniques is just too severe, and the cost and complexity of certain of their component parts is too high.

SUMMARY OF THE INVENTION

This invention is directed to solving these and other shortcomings of the prior art. According to one aspect of the invention, a component video communications system includes a sampler that samples an analog component video signal at a frequency that is both an odd multiple of one-half the horizontal rate and a weighted sub-Nyquist frequency of the video signals. Weighted sub-Nyquist sampling, defined in the specification, reduces the sampling rate to below the Nyquist sampling rate, and hence lowers the required digital transmission rate from that required by a comparable system using super-Nyquist sampling. Yet, at the same time, weighted sub-Nyquist sampling results in less image degradation than would sampling at a full sub-Nyquist rate.

Preferably, the system includes a high-band comb filter for combing out of the analog component video signal those frequency components that lie at and about odd multiples of one-half the horizontal rate in the frequency region where spectral interleaving will result from lower than super-Nyquist sampling during digitization of the signal. The combing improves image quality by avoiding distortion that would result from superposition of spectral components of the baseband and aliasing spectra that become interleaved in the sampling process. Because weighted sub-Nyquist sampling is used, the combing need not extend deeply enough into the baseband spectrum of the signal that is being combed to produce degradations that were ascribed above to combing.

Preferably, the comb filter is characterized by a sharp cut-off. Thereby full combing of the region of interleaving is possible without extensive combing of the remainder of the signal's baseband spectrum. Hence the loss of information and resulting image distortion are minimized.

Preferably, the system includes low-pass filters for band-limiting analog component video signals prior to digitization of the signals, which filters are likewise characterized by a sharp cut-off. Such filters minimize the transition band of the signals' spectra and hence serve to minimize the sampling frequencies required for either super-Nyquist or weighted sub-Nyquist sampling. This serves to minimize the digital rate required for transmission of digitized signals that have been sampled at such frequencies.

Preferably, the pass band of the luminance low-pass filter is twice the pass band of the chrominance low-pass filters, to make the system compatible with the 4-2-2 component digital video format which is becoming an international standard. This format itself is an important contributor to increased quality as compared to the NTSC format. Also preferably, the luminance bandwidth is 4.2 MHz, thereby making the system compatible with and optimized for transmissions of NTSC-format video components.

Preferably, only chrominance signals are sampled at a weighted sub-Nyquist frequency, while luminance signals are sampled at a super-Nyquist frequency and hence need not be comb filtered prior to sampling. The luminance signals are thereby not degraded, and advantage is taken of the lower sensitivity of the eye to distortion in the chrominance than in the luminance of an image to minimize the transmission rate without noticeably sacrificing image quality.

According to a second aspect of the invention, a component video communications system includes high-band comb filters having gentle cut-off characteristics for combing component video signals that have been received and reconverted from digital to analog form, to substantially comb out of the received signals spectral components that were introduced therein by sampling, even at super-Nyquist frequency, during digitization. Because gentle cut-off filters introduce little or no phase distortion into the filtered signals, little or no phase delay equalization need be done on the filtered signals. Hence simple and inexpensive filters may be used, and use of phase equalization circuitry therewith may be avoided at the receiver. This results in lower cost of the receiver without accompanying degradation of the received image, as compared to designs that use sharp cut-off filters.

Preferably, low-pass filters that also have gentle cut-off characteristics are used in conjunction with the comb filters to further attenuate in the received analog signals the spectral components that were introduced therein by sampling. Again, the gentle cut-off results in little or no phase distortion, and hence little or no phase delay equalization is required for the filtered signals. Thus, again, simple and inexpensive filters may be used, and use of phase equalization circuitry therewith may be avoided. This results in a low-cost improvement to the image quality, as compared to the design that uses comb filtering only. Alternatively, this results in lower cost of the receiver without an accompanying degradation of the received image, as compared to designs that use sharp cut-off filters.

These and other advantages of the present invention will become more apparent during the following description of an illustrative embodiment of the invention considered together with the drawing.

BRIEF DESCRIPTION OF THE DRAWING

FIGS. 1A, 1B and 1C together diagram in block form an illustrative component video communications system;

FIG. 2 shows the arrangement of FIGS. 1A, 1B and 1C to form a complete figure;

DETAILED DESCRIPTION

Figure 1A:
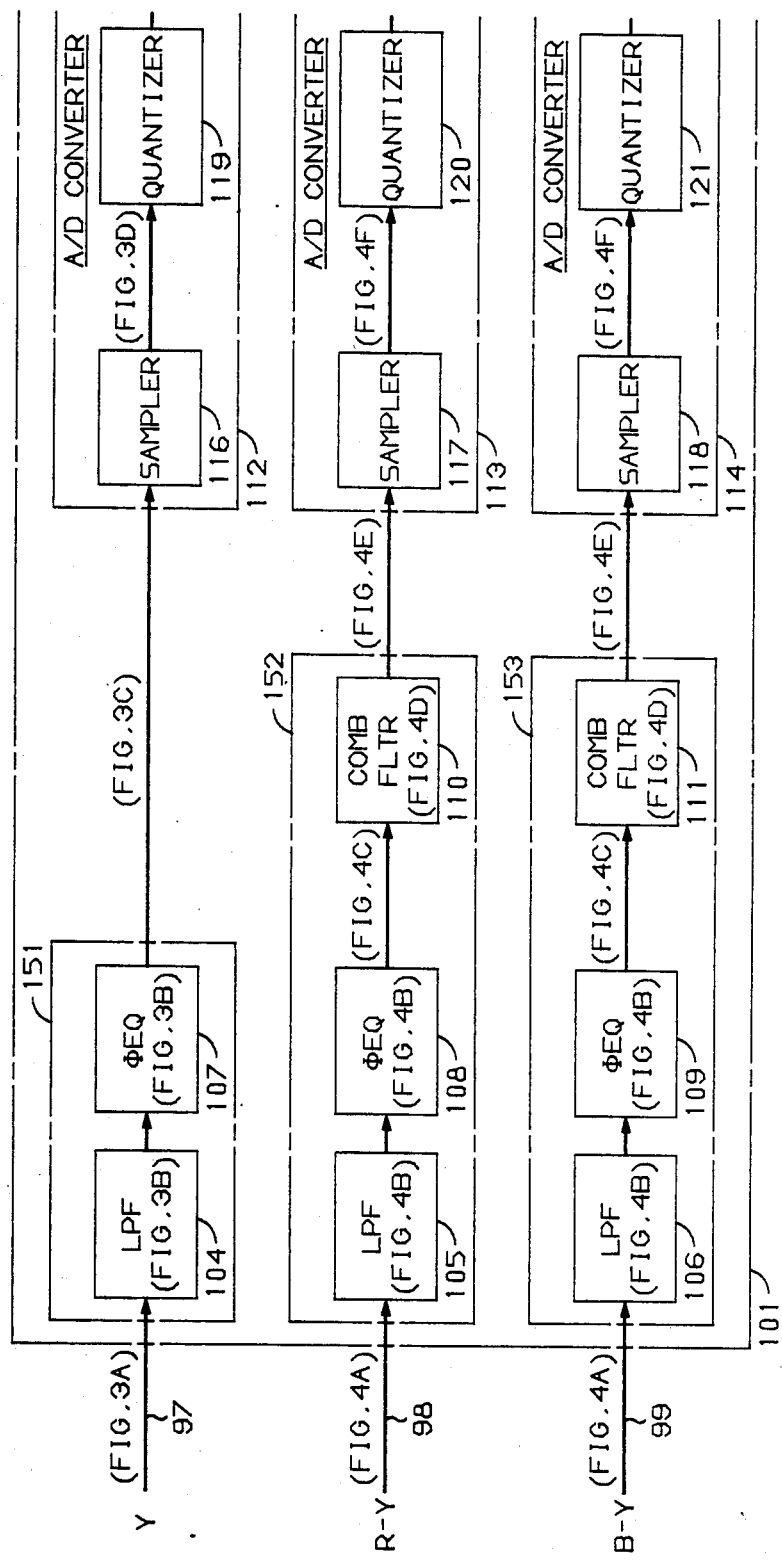
Figure 1B:
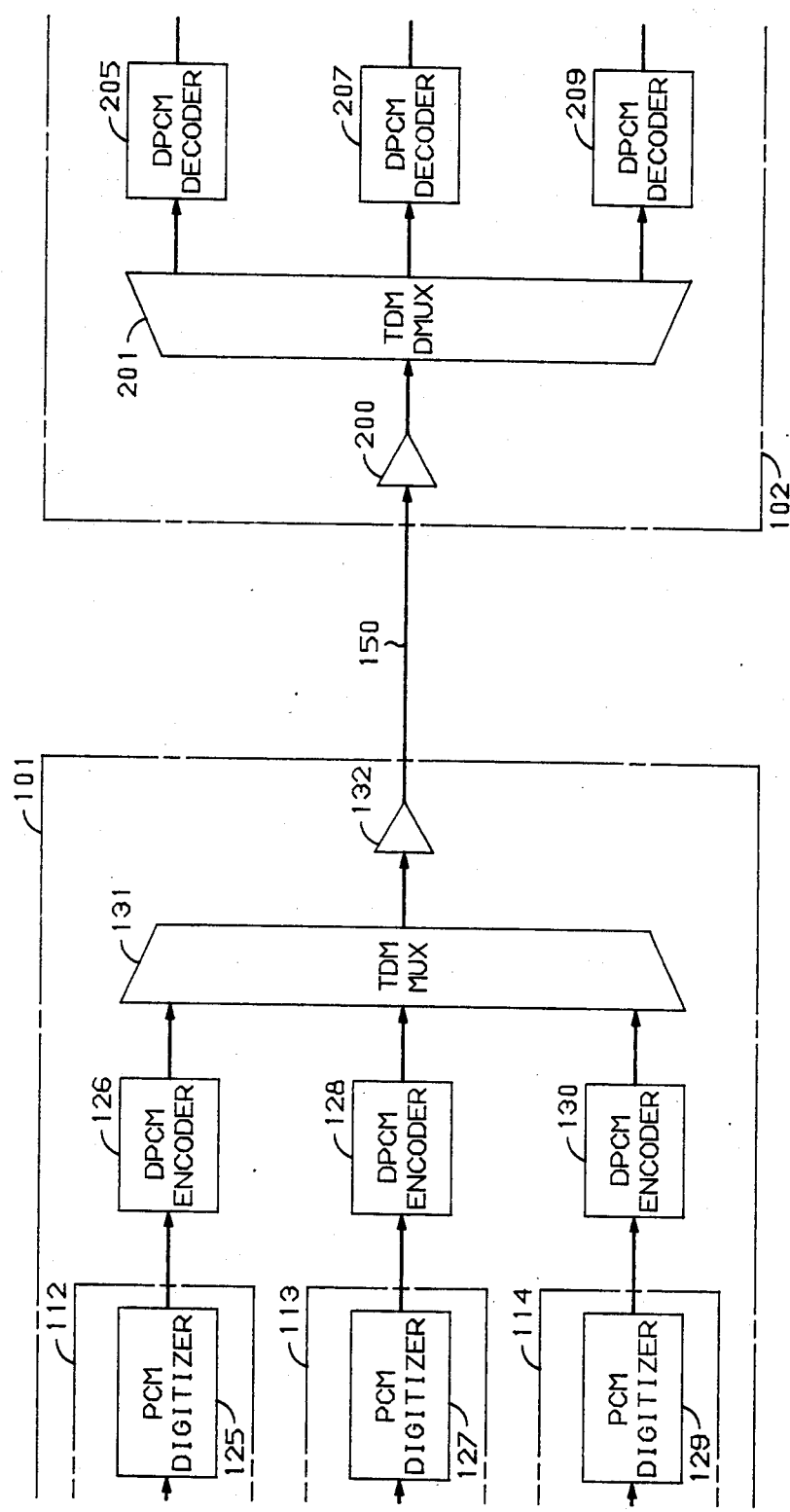

Turning to the figures, FIGS. 1A through 1C together show an illustrative component video communication system which may be, for example, a high-definition television (HDTV) broadcast system. Block 101 shows the transmitter portion of the system while block 102 shows a receiver portion of the system. Commonly, such a system includes one transmitter portion that is associated with the provider of the video communication service, and a plurality of receiver portions each one of which is associated with a subscriber to the service.

The video input to the transmitter portion comprises three analog component video signals: a luminance signal input 97, conventionally designated as Y, and two chrominance signal inputs 98 and 99, conventionally designated as (R-Y) and (B-Y), respectively. The luminance signal Y carries the contrast information about an image, while the chrominance signals (R-Y) and (B-Y) carry information about the color of the same image.

The three component color video signals are processed in parallel at the transmitter portion 101. Each analog component video signal is processed to ready it for digitization and then is converted into a digital signal. The three digital signals are then combined into a single digital stream and transmitted to the receiver portion 102. At the receiver portion, this process is reversed. The received signal stream is separated into its three component digital signals. These are then reconverted from digital to analog form and processed in parallel to obtain, for display purposes, signals which to the eye reproduce the image represented by the signals at the inputs 97-99.

FIGS. 3 and 4 illustrate the amplitude vs. frequency characteristics both of the component color video signals at various stages of processing and of various of the processing elements. It should be noted that FIGS. 3 and 4 are not drawn true to scale or form. They are merely suggestive representations that are intended to suggest and emphasize certain characteristics that are discussed in the text.

As is well known in the art, the component video signals at the inputs 97-99 have similar frequency spectrum characteristics. This is shown by the curve 300 in FIG. 3A which shows the energy, or spectral, distribution of the luminance signal Y, and by the curve 400 in FIG. 4A which shows the spectral distribution of the chrominance signals (R-Y) and (B-Y). As these figures indicate, the component video signals are baseband signals and the energy of each of the component video signals is distributed periodically. Each component video signal has energy peaks, or concentrations, 301 and 401, respectively, at and about integral multiples of the image horizontal rate, or line scan frequency, $f_H$, and has energy nulls 302 and 402, respectively, at and about odd multiples of one-half of the horizontal rate. Conventionally for television, $f_H$ is 15.734 KHz. The amplitude of the analog component signals steadily decreases with increasing frequency. This is indicated in FIGS. 3A and 4A by the spectral envelopes 303 and 403, respectively, which are shown in dashed lines.

Figure 3A:
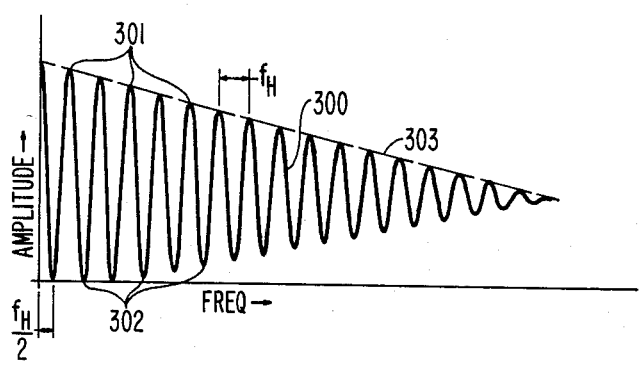
FIGS. 3A through 3H are diagrams of frequency-domain characteristics of luminance signals and luminance-processing devices in FIGS. 1A through 1C that refer to those figures.
Figure 4A:
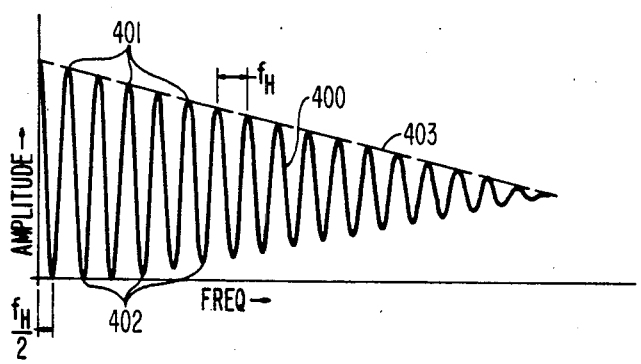
FIGS. 4A through 4J are diagrams of frequency-domain characteristics of chrominance signals and chrominance-processing devices in FIGS. 1A through 1C that refer to those figures.

It will be noted that at higher frequencies the energy nulls 302 and 402 are shown in FIGS. 3A and 4A as not reaching zero amplitude. This is intended to suggest that signals representing image diagonal patterns and images with motion have an energy distribution that tends to have significant concentrations at and about odd multiples of one-half of the horizontal rate $f_H$. Image diagonal patterns generally represent only a small portion of the total image energy and are noticeable primarily at the higher frequencies.

Referring to FIG. 1A, the component video signals are passed from the inputs 97-99 through filter complexes 151-153, respectively, each signal through one filter. These serve to restrict each of the component video signals to a baseband of a predetermined bandwidth and to eliminate or restrict aliasing that would result from signal sampling.

Figure 3B:
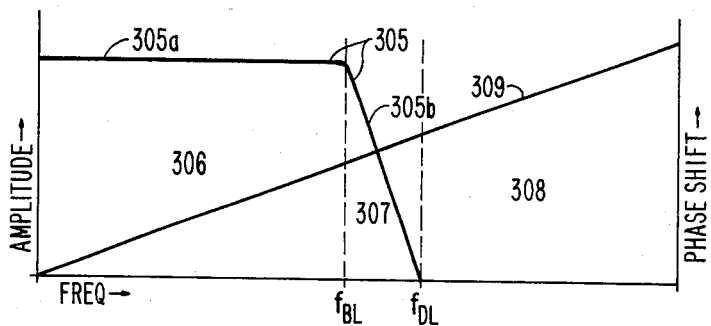

Each filter complex 151 ∝ 153 includes a low-pass filter 104-106, respectively, for limiting an input signal to a baseband. The characteristic of the luminance low-pass filter 104 is illustrated by curve 305 in FIG. 3B. The filter 104 is a constant-amplitude filter, as illustrated by portion 305a of the curve 305, so as to introduce a minimum of amplitude distortion into the baseband of the luminance signal. The filter 104 has a pass band 306 of bandwidth $f_{BL}$. The pass band is defined as the frequency region in which signals pass through the filter substantially unattenuated, i.e., attenuated by less than about 3 decibels (dB). In this illustrative example, the bandwidth $f_{BL}$ is selected to be equal to the 4.2 MHz luminance signal bandwidth of NTSC color television broadcasts. The filter 104 is also a high-selectivity filter, i.e., one having a sharp cut-off, as represented by portion 305b of the curve 305. The sharp cut-off limits the filter's transition band 307 to a very narrow region. The transition band is defined as the region between the pass band and the stop band. The stop band is in turn defined as the frequency region in which the rejection of the filter is sufficient to block signals so that they are invisible in the image. The minimum value of attenuation necessary to ensure that signals are invisible varies somewhat with the observer and the image being viewed, but tends to fall between about 30 and 40 dB. Sharp cut-off, for purposes of this application, indicates that the bandwidth of the transition band is no greater than about 15 percent of the pass-band bandwidth. Hence in this illustrative example where $f_{BL}$ is 4.2 MHz, the stop band 308 extends upward from a frequency no greater than about 4.8 MHz. In FIG. 3B, the frequency that marks the boundary between the transition band 307 and the stop band 308 is designated as $f_{DL}$.

The high selectivity of the filter 104 introduces into the signal a high amount of phase distortion, as was discussed previously. Therefore there is associated with the filter 104 a phase equalizer 107, included in the filter complex 151, that imposes on the output of the filter 104 a linear phase shift characteristic, illustrated in FIG. 3B by curve 309. As indicated on the right-hand side of the figure, the abscissa of the phase characteristic represents the amount of phase shift.

While such filter 104 and equalizer 107 are expensive, this consideration is offset by the fact that only one such filter 104 and equalizer 107 are needed for the luminance signal in the system of FIGS. 1A-1C, at the transmitter portion 101. Use thereof is shared by a plurality of receiver portions 102, and the performance thereof simplifies and lowers the cost of the receiver portions. Hence the expense is justified. This tradeoff is characteristic of a broadcast service, where extra cost is typically inserted into the transmitter to lower the cost of the many receivers.

Figure 3C:
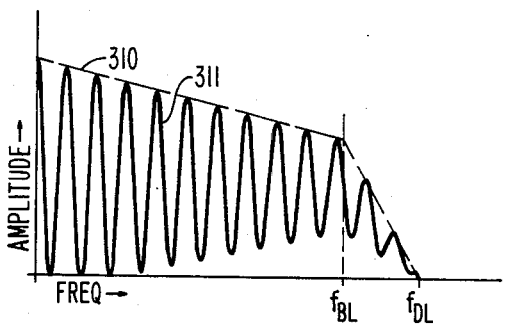

The effect of the filter 104 on the luminance signal Y is illustrated in FIG. 3C. As the luminance signal's new envelope 310 shows, the bandlimited luminance signal's spectrum 311 has only highly attenuated frequency components above $f_{BL}$, and only in a very narrow frequency region.

Figure 4B:
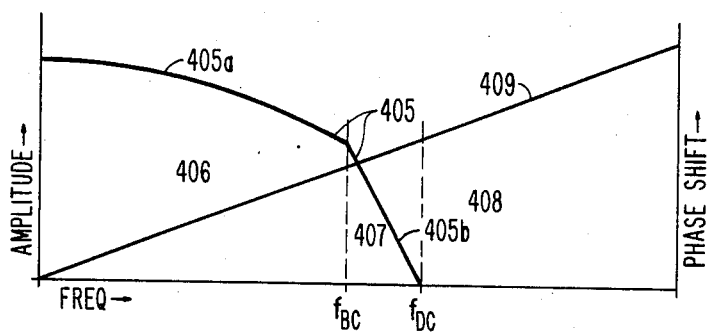

The characteristic of the chrominance low-pass filters 105 and 106 of the filter complexes 152-153, respectively, is illustrated by curve 405 in FIG. 4B. Like the luminance low-pass filter 104, the chrominance low-pass filters 105 and 106 are high-selectivity filters. The filters 105 and 106 have proportionally the same sharp cut-off, represented by portion 405b of the curve 405, as the luminance filter 104. However, they need not be constant amplitude filters but rather may have a Gaussian curve characteristic, as illustrated by the portion 405a of the curve 405 above the pass band 406. Such filters are known in the art. A Gaussian characteristic is imposed on the chrominance signals to eliminate the Gibbs effect, which is known to cause ringing in the image. This imposition need not be made by the filters 105-106, but may be done elsewhere in the system, in which case the filters 105-106 will typically be of constant amplitude.

The bandwidth $f_{BC}$ of the filters 105 and 106 is selected to be one-half of the luminance bandwidth $f_{BL}$, or 2.1 MHz in this illustrative example. The choice of $f_{BC}$ as one-half of $f_{BL}$ makes the system particularly suitable for transmissions of video signals that meet the 4-2-2 components digital video format. The 4-2-2 format is an international standard for sampling and recording chrominance component video signals at one-half the bandwidth and frequency, respectively, of the luminance component video signal. The 4-2-2 format is itself an important contributor to increased image quality as compared to the NTSC format bandwidths of the component video signals. Given the choice of $f_{BC}$ as 2.1 MHz, the pass band 406 of the filters 105 and 106 extends to 2.1 MHz, the transition band 407 extends from 2.1 MHz to about 3.1 MHz, and the stop band 408 extends upward from about 3.1 MHz. In FIG. 4B, the frequency that makes the boundary between the transition band 407 and the stop band 408 is designated as $f_{DC}$.

Figure 4C:
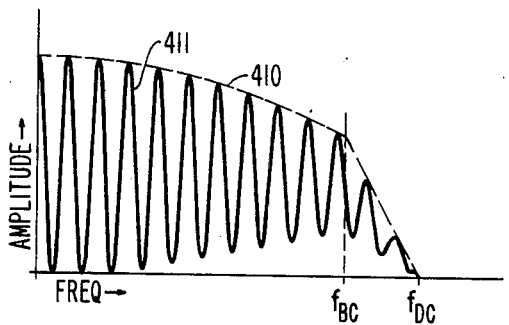

Like the luminance filter 104, the chrominance filters 105 and 106 have associated therewith phase equalizers 108 and 109, respectively, shown in FIG. 1A, which impose on the outputs of the respective filters a linear phase-shift characteristic. This characteristic is illustrated in FIG. 4B by curve 409. The effect of the filters 105 and 106 on the chrominance signals is illustrated in FIG. 4C. As the signals' new envelope 410 shows, the bandlimited equalized chrominance signals have only highly attenuated frequency components above $f_{BC}$, and only in a very narrow frequency region.

Consideration of FIG. 1A is now resumed. Having passed through the filter complex 151, the luminance signal is fed into an analog-to-digital converter 112 for digitization. The converter 112 comprises a sampler 116 for pulse-amplitude sampling the luminance signal, a quantizer 119 for converting each luminance sample pulse amplitude into a quantized signal, and a digitizer 125 for converting each quantized signal into digital form. Such devices are known in the art. The sampler 116 samples the luminance signal at a super-Nyquist frequency $f_{SL}$, to avoid aliasing. Theoretically—assuming no transition band—the Nyquist frequency of the luminance signals is twice the bandwidth, or 8.4 MHz in this example, and $f_{SL}$ is selected to be about 12.6 MHz. Furthermore, $f_{SL}$ is selected to be an odd multiple of one-half of the horizontal rate $f_H$, as is conventional in the art for sub-Nyquist sampling.

Figure 3D:
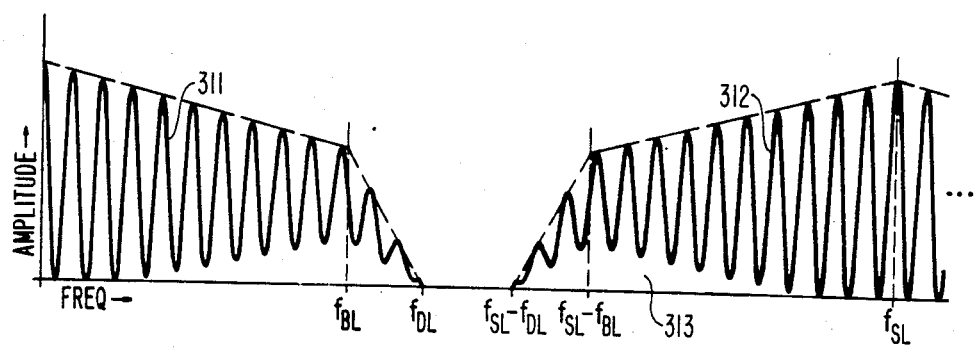

As is known in the art, sampling produces in the sampled signal's frequency spectrum replicas of the original sampled signal, at harmonics of the sampling frequency. Hence the signal samples represent a spectrum comprising the original sampled signal, and replicas thereof that form upper and lower sidebands of the harmonics of the sampling frequency. This is illustrated in FIG. 3D, which shows the baseband spectrum 311 and the replica 312 that forms the lower sideband of the sampling frequency $f_{SL}$. Since $f_{SL}$ is an odd multiple of one-half the horizontal rate $f_H$, energy peaks of the replica 312 fall at odd multiples of one-half $f_H$ while energy nulls of the replica 312 fall at integer multiples of $f_H$, the exact opposite of the distribution of the baseband spectrum 311.

The passband of the replica 312 extends down to frequency $f_{SL}-f_{BL}$, or 8.4 MHz in this example. The transition band of the replica 312 extends down to frequency $f_{SL}-f_{DL}$, or 7.8 MHz in this example. Hence there is no interleaving of the original baseband spectrum 311 and the replicated spectrum 312, not even of their transition bands, so no aliasing energy is introduced into the original baseband spectrum 311.

Returning to a consideration of FIG. 1A, the analog luminance signal samples are fed to the quantizer 119, which "rounds off" each sample's amplitude to the nearest quantized level, in a conventional manner. The quantized samples are then fed to the digitizer 125, indicated in the example of FIG. 1B to be a conventional pulse-code modulator (PCM), which converts the quantized samples into multi-bit digital signals. The number of bits into which the samples are converted is largely dictated by the desired image quality and the signal encoding technique that will be used for transmission. For example, HDTV-quality resolution may require digitizing at 8 bits per sample.

While the bandlimited and equalized luminance signal Y is fed from the filter 104 and phase equalizer 107 directly into the A/D converter 112, the bandlimited and equalized chrominance signals (R-Y) and (B-Y) are first processed in comb filters 110 and 111, respectively, of the filter complexes 152-153, respectively, before being fed into their A/D converters 113 and 114, respectively.

Comb filters are known in the art. They exhibit a frequency characteristic such as is shown by curve 412 in FIG. 4D. They remove—comb out—from a signal frequency components that occur at and about multiples of a given frequency while passing through other frequency components. The comb filters 110 and 111 comb out frequencies at and about odd multiples of one-half the horizontal rate $f_H$ while passing frequencies at and about integer multiples of $f_H$.

Figure 4D:
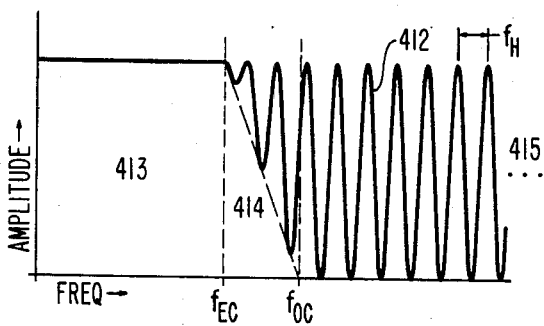

The filters 110 and 111 are high-band comb filters, in that they pass baseband frequencies without combing and only comb higher frequencies, as indicated in FIG. 4D by the curve 412. The comb filters 110 and 111 have a baseband pass band 413 that extends to frequency $f_{EC}$, a transition band 414 that extends from frequency $f_{EC}$ to frequency $f_{OC}$, and a combing band 415 that extends upward of frequency fOC. In direct analogy to the filters 104-106, the pass band is defined as the frequency region in which all signals pass through the comb filter substantially unattenuated, i.e., attenuated by less than about 3; the combing band is defined as the frequency region in which the rejection of the filter is sufficient to block the combed-out signals enough to make them invisible, i.e., attenuate the combed-out signals by about 30 to 40 dB, while passing the other signals substantially unattenuated, and the transition band is the region between the pass band and combing band.

The frequency $f_{OC}$ of the comb filters 110 and 111 is selected to be no higher than, and preferably equal to, $f_{SC}-f_{BC}$, where $f_{SC}$ is the sampling frequency of the A/D converters 113 and 114. The frequency $f_{EC}$ of the comb filters 110 and 111 is selected to be no higher than, and preferably equal to, $f_{SC}-f_{DC}$. The comb filters 110 and 111 thus serve to comb from the chrominance signals the energy of diagonal patterns at least down to the frequency to which the spectrum of the original bandlimited chrominance signals, designated as 411 in FIG. 4C, and the replica thereof that forms the lower sideband of the sampling frequency, designated as 413 in FIG. 4F, will interleave after sampling. Since $f_{SC}$ is likewise selected to be an odd multiple of one-half of the horizontal rate $f_H$, in the interleaved spectrum of FIG. 4F the diagonal-pattern energy of the replica 413 would become superimposed on the energy peaks of the original baseband spectrum 411, causing distortion thereof. Combing out of the diagonal-pattern energy in the region of interleaving prevents this distortion from occurring. While the comb-filtering does result in the loss of some diagonal information, it prevents the more-noticeable distortion of vertical information. Furthermore, the comb-filtering is generally restricted to the upper frequency region of the baseband video signals, so it does not reduce vertical resolution and only causes a minimum softening of diagonal lines.

Consideration now returns to FIG. 1A. Since the transition region 414 in FIG. 4D of the comb filters 110 and 111 is substantially equal to the transition region 407 in FIG. 4B of the low-pass filters 105 and 106, the filters 110 and 111 are likewise sharp cut-off filters. Hence they may, depending on their implementation, introduce into the chrominance signals phase distortion which must be removed with the aid of phase equalizers. Therefore, the filters 110 and 111 may have associated with them phase equalizers which reimpose upon the chrominance signals the linear phase shift characteristic shown by curve 409 in FIG. 4B. Preferably, however, the phase equalization for the whole of each filter complex 152 and 153 is handled by the single phase equalizer 108 and 109, respectively.

Figure 4E:
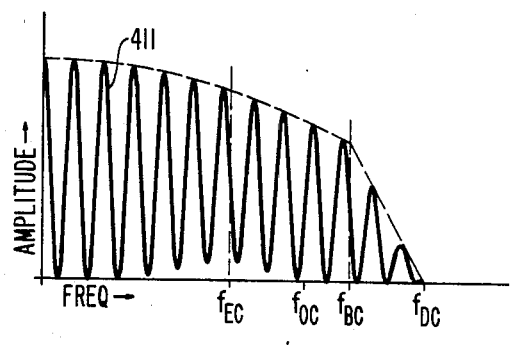

The frequency spectrum of the combed chrominance signals is shown in FIG. 4E.

After passing through the filter complexes 152 and 153, the combed chrominance signals are fed to the A/D converters 113 and 114, respectively. The converters 113 and 114 are analogous to the converter 112. The converter 113 comprises a sampler 117, a quantizer 120, and a PCM digitizer 127, while the converter 114 comprises a sampler 118, a quantizer 121, and a PCM digitizer 129.

Figure 4F:
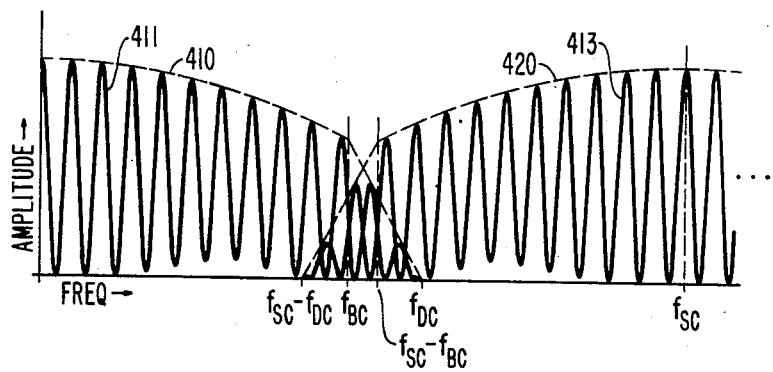

Because the human eye is much more sensitive to luminance information than to chrominance information, greater distortion and lesser resolution of chrominance signals is tolerable than of luminance signals. Hence the chrominance samplers need not sample the chrominance signals at super-Nyquist frequency to ensure that there will be no interleaving of the original signal's energy spectrum 411 with its replica 413. However, sub-Nyquist frequency sampling, which results in interleaving of the original signal's pass-band energy spectrum with the replicated pass-band energy spectrum 413, is likely to introduce so much distortion into the chrominance signals as to not be acceptable for high-quality image transmissions such as component video or HDTV. Hence a compromise is made and the chrominance sampling frequency $f_{SC}$ is selected such as to result only in interleaving that is due to the transition band spectra of the original signal and the replica. The pass-band spectra of the original signal and the replica are not interleaved with each other. The values of the sampling frequency $f_{SC}$ that satisfy this criterion are herein referred to as weighted sub-Nyquist frequencies. They are all values of the $f_{SC}$ such that both $f_{SC}-f_{BC}>f_{BC}$ and $f_{SC}-f_{DC}<f_{DC}$. The frequency $f_{SC}$ must also be an odd multiple of one-half of the horizontal rate $f_H$, to result in the interleaving, as opposed to superposition, of the overlapping portions of the original signal spectra 411 and the replica 413. Furthermore, it is desirable to select an $f_{SC}$ whose integral multiple substantially equals $f_{SL}$, to aid in the generation of both $f_{SC}$ and $f_{SL}$ from a common clock source. In this example, $f_{SC}$ is selected to be one third of $f_{SL}$, or about 4.2 MHz. Sampling of the bandlimited and combed chrominance signals at the weighted sub-Nyquist frequency $f_{SC}$ produces a sampled-signal spectrum substantially as shown in FIG. 4F.

Alternatively, a technique known as subsampling may be used, whereby the signals are sampled at a frequency that is higher than $f_{SC}$ but some of the samples are discarded to produce an effective rate of $f_{SC}$ signals for input to the digitizers. Equivalently, this is frequently implemented by discarding selected code words output by the A/D converter. For the example here, the chrominance signals could be sampled at $f_{SL}$ but only every third word or sample would be transmitted. For purposes of this application, this technique is considered to be the equivalent of sampling the signals at $f_{SC}$, supplying all of the samples to the digitizers, and transmitting all of the digitized samples.

Returning to FIG. 1A, the samples of the chrominance signals are fed by the samplers 117 and 118 through the quantizers 120 and 121, respectively, to the digitizers 127 and 129, respectively. In this example it is assumed that, just like the luminance signal, each sample of the chrominance signals is converted into an 8-bit digital signal. Alternatively, if lesser amplitude resolution may be tolerated for chrominance than for luminance signals, the chrominance signal samples may be converted to fewer bits than the luminance signal samples.

Referring to FIG. 1B, the outputs of the A/D converters 112–114 are optionally input to encoders 126, 128, and 130, respectively. In this example, each encoder 126, 128, and 130 is a DPCM encoder. DPCM encoders are conventional. They encode only information about the difference between successive digitized samples, thereby reducing the number of bits required to carry information about samples, and hence reducing the bandwidth required for transmission. For example, while PCM encoding alone requires digitizing at 8 bits per sample in this example to achieve a desired level of resolution, DPCM encoding reduces this to 4 bits per sample for the same subjective level of amplitude resolution.

The encoded signals output by the encoders 126, 128, and 130 are fed to a conventional time-division-multiplex multiplexer (TDM MUX) 131. The multiplexer 131 combines the encoded signals into a single signal stream for transmission. Alternatively, the encoded signals could be multiplexed in a format other than TDM, or they could be transmitted, without multiplexing, as separate signals.

The output of the multiplexer 131 is fed to a transmitter 132 for transmission on a selected medium 150. The medium 150 could be any suitable medium, such as wire or microwave. In this example, the medium 150 is taken to be a telephony digital trunk having a bandwidth adequate to transmit 90 Mb/s. The medium 150 couples the transmitter portion 101 with the receiver portion 102.

The transmitted signal stream is received over the medium 150 by a receiver 200. The receiver 200 supplies the received signal stream to a TDM demultiplexer 201 which separates the signal stream into its three component encoded luminance and chrominance signals. The received luminance signal is fed to a decoder 205 while each of the received chrominance signals is fed to one of two decoders 207 and 209. The decoders 205, 207, and 209 function as the converse of the encoders 126, 128, and 130, respectively. Hence, each decoder 205, 207, and 209 is a DPCM decoder. The DPCM decoders decode the DPCM-encoded signals back into PCM format. Such decoders are known in the art.

Referring to FIG. 1C, the decoded received signals are input from the decoders 205, 207, and 209 into digital-to-analog (D/A) converters 211–213, respectively. The converters 211–213 function as the converse of the PCM digitizers 125, 127, and 129, respectively. They convert the digital signals from digital to analog form. Such converters are known in the art. For example, they may comprise the known R-2R resistor ladder networks.

The analog received signals have the energy spectra of the signal samples from which they were derived. Hence the received luminance signal has the spectrum of FIG. 3D, while the two received chrominance signals have the spectrum of FIG. 4F. As these figures show, the received signals include both the original signals' baseband spectra and their replicas. Hence, to obtain the original signals from the received signals, the spectral replicas must be removed. For this purpose, the analog received signals are input to filter complexes 221–223.

Conventionally, a low-pass filter is used in situations such as this to remove most or all of the replicated spectra. The expense and signal distortion associated with the use of a sharp cut-off low-pass filter has been discussed previously. Therefore use of a sharp cut-off low-pass filter in the receiver portion 102 of the system is not desirable. It would be preferable to use a low-pass filter that has a gentle cut-off characteristic. Such a filter is simple and inexpensive to build, and has little or no phase degradation naturally because of its gentle cut-off characteristic. Thus the use of such a filter further may avoid the expense and complication of using a phase equalizer therewith.

However, the use of a gentle cut-off filter means that there is a large transition band in which the amplitude of the filtered signal does not reach the full attenuation need in the stop band. This would normally result in some image degradation because some of the replicated spectrum would lie in the transition band of the filter and would not receive the needed attenuation.

To avoid this problem, the received signals are fed from the D/A converters 211 ∝ 213 into high-band comb filters 214–216, respectively. The frequency characteristic of the luminance comb filter 214 is shown by curve 320 in FIG. 3E, and the characteristic of the chrominance comb filters 215–216 is shown by curve 432 in FIG. 4G.

Figure 3E:
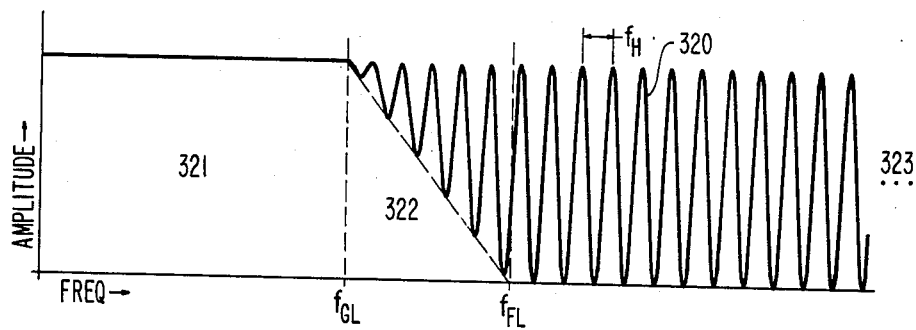

As FIG. 3E shows, the luminance comb filter 214 has a baseband pass band 321 extending up to frequency $f_{GL}$, a transition band 322 extending from frequency $f_{GL}$ to frequency $f_{FL}$, and a combing band 323 extending upward from $f_{FL}$. The combing peaks, i.e., amplitude nulls, of the comb filter 214 are centered at odd multiples of one-half the horizontal rate $f_H$. Since the peaks of the luminance replicated spectrum 312 (see FIG. 3D) lie at and about the same frequencies, the comb filter 214 removes the replicated spectrum 312 and passes the original signal's spectrum 311. The frequency $f_{FL}$ is selected to lie near, but preferably at, the frequency $f_{SL} - f_{DL}$, and is always selected to be less than the frequency $f_{SL} - f_{BL}$, to provide combing in the region of the replicated spectrum 312. The frequency $f_{GL}$ is selected to lie at or above, but preferably at, the frequency $f_{BL}$, to provide attenuation everywhere outside of the original luminance signal's baseband spectrum without affecting the diagonal information in the baseband spectrum. Because of the spread of frequencies between $f_{BL}$ and $f_{SL} - f_{DL}$, the comb filter 214 is able to have a gentle roll-off characteristic. Hence the filter 214 introduces into the signal little or no phase distortion. Consequently, the comb filter 214 need not be accompanied by phase equalization circuitry. The spectrum of the comb-filtered received luminance signal is shown in FIG. 3F.

Figure 3F:
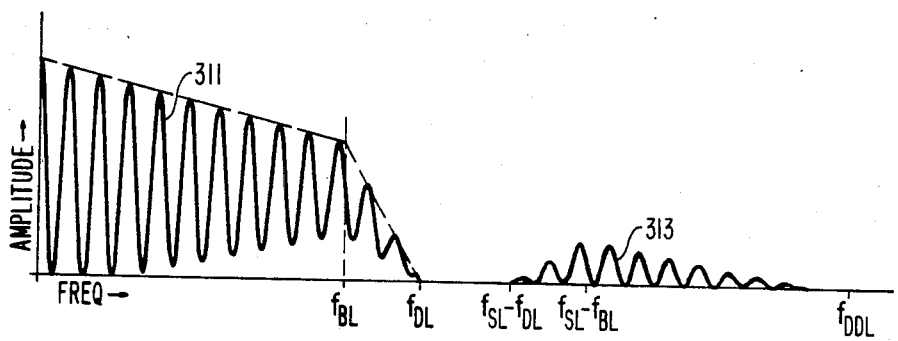
Figure 3G:
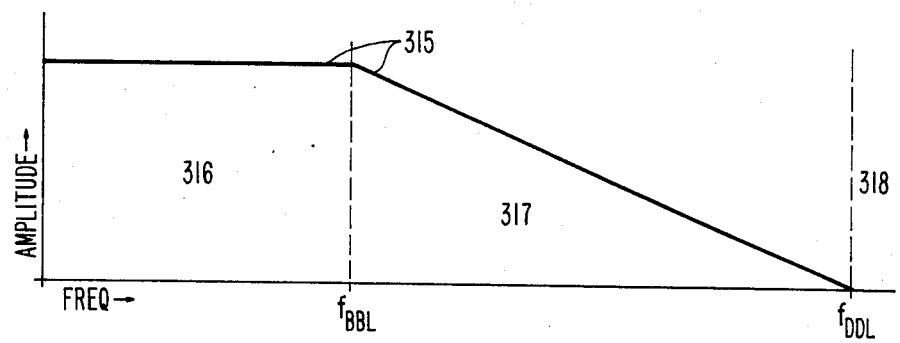

As FIG. 3F shows, the comb filter 214 removes virtually all of the replicated spectrum 312. At most what remains is some of the diagonal information carried in the replicated spectrum 312, which lies at integral multiples of the horizontal rate $f_H$ and hence is not combed out by the filter 214. The remaining diagonal information spectrum is indicated by curve 313 in FIG. 3F.

This diagonal information spectrum 313 is removed by passing the received analog luminance signal through a gentle cut-off low-pass filter 217 of the filter complex 221, as shown in FIG. 1B. The characteristic of such a filter has been discussed above and is shown in FIG. 3G. As FIG. 3G indicates, the filter 217 has a pass band 316 extending to frequency $f_{BBL}$, a transition band 317 extending from frequency $f_{BBL}$ to frequency $f_{DDL}$, and a stop band 318 extending upward from frequency $f_{DDL}$. Preferably, the frequency $f_{BBL}$ is selected to be at the frequency $f_{BL}$, to pass the baseband of the original luminance signal substantially without attenuation. The frequency $f_{DDL}$ is selected to be substantially above $f_{BBL}$, to provide the filter 217 with a gentle cut-off so that it produces little or no phase degradation and hence eliminates the need to use a phase equalizer in conjunction with it. However, $f_{DDL}$ must be selected such that, even though the diagonal information replicated spectrum 313 lies in the filter's transition band 317, it becomes sufficiently attenuated so as to become invisible in the image.

Alternatively, if the depth of combing of the comb filter 214 is sufficient, the use of the low-pass filter 217 may be eliminated. This could create some problem with diagonal patterns caused in the image by the replica's diagonal spectrum 313. However, the high frequency response of a monitor used to display the image and the sampling aperture of the A/D converter 211 will typically roll off the high frequencies enough to make use of the filter 217 unnecessary for many applications.

Figure 3H:
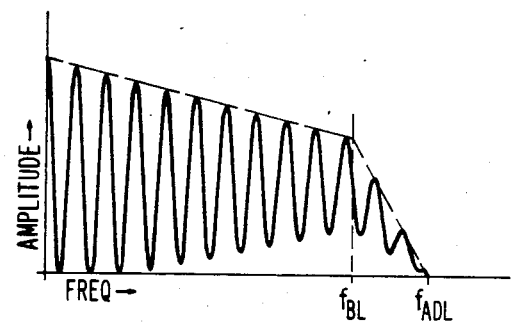

The filtered received luminance signal, designated as Y in FIG. 1C, has the spectrum shown in FIG. 3H. This spectrum is substantially a duplicate of the spectrum of the bandlimited original luminance signal shown in FIG. 3C. The transition band of the spectrum of FIG. 3H extends only to frequency $f_{ADL}$ and not to the frequency $f_{DL}$ of FIG. 3C, the transition band having been attenuated somewhat by the filter 217.

The received chrominance signals are processed in a manner directly analogous to the processing of the received luminance signal. The received chrominance signals are passed from the D/A converters 212-213 into the filter complexes 222 and 223, respectively, which include high-band comb filters 215-216, respectively, whose frequency characteristic is shown by curve 432 in FIG. 4G.

Figure 4G:
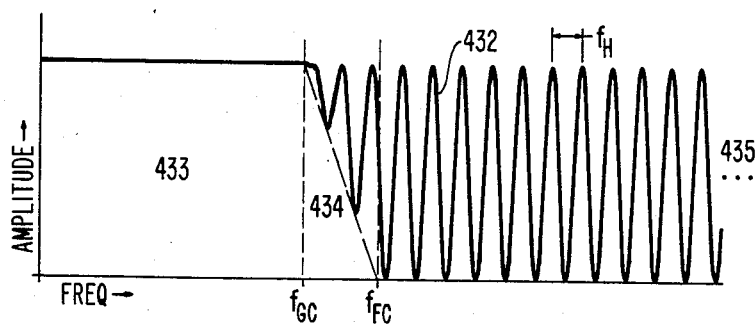

As FIG. 4G shows, the chrominance comb filters 215-216 have a baseband pass band 433 extending up to frequency $f_{GC}$, a transition band 434 extending from frequency $f_{GC}$ to frequency $f_{FC}$, and a combing band 435 extending upward from $f_{FC}$. The combing peaks of the comb filters 215-216 are centered at odd multiples of one-half the horizontal rate $f_H$. Since the peaks of the chrominance replicated spectra 413 (see FIG. 4F) lie at and about the same frequencies, the comb filters 215-216 remove the replicated spectra 413 and pass the original signal spectra 411. The frequency $f_{FC}$ is selected to lie at or below, but preferably at, the frequency $f_{SC} - f_{BC}$, to provide full combing in the region of the baseband of the replicated spectrum 413. The frequency $f_{GC}$ is selected to lie below the frequency $f_{SC}-f_{DC}$, to provide attenuation of the transition band of the replicated spectrum 413 everywhere, yet also to provide a gentle cut-off characteristic that will not introduce significant phase distortion into the signals.

Figure 4H:
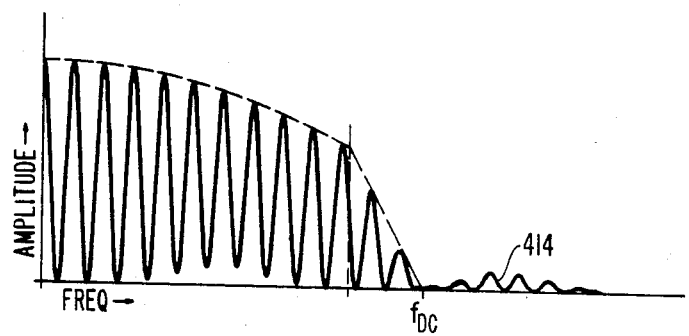

The extent of the transition band 434 into the baseband spectrum 411 will affect somewhat the diagonal information in that portion of the baseband spectrum that lies above $f_{GC}$. However, because of both the relative insensitivity of the eye to the affected information and the reduced depth of combing, this is not likely to produce a visible degradation of the image. The spectrum of the comb-filtered received chrominance signals is shown in FIG. 4H. As FIG. 4H shows, the comb filters 215-216 remove virtually all of the replicated spectra 413, with the exception of some diagonal information spectra indicated by curve 414 in FIG. 4H.

Figure 4I:
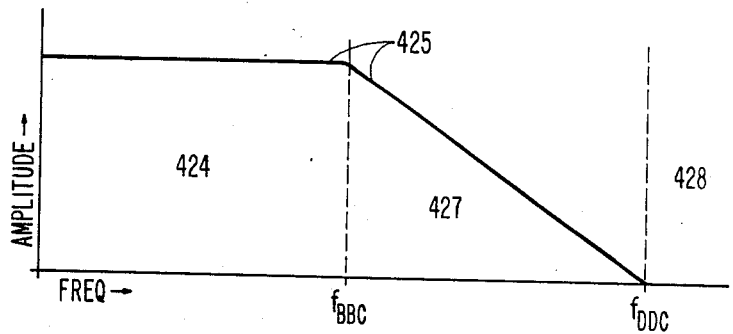

The diagonal information spectra 414 are removed by passing the received analog chrominance signals through gentle cut-off low-pass filters 218-219, respectively, of the filter complexes 222-223, respectively, as shown in FIG. 1C. The characteristic of the filters 218-219 is shown in FIG. 4I. As is there indicated, the filters 218-219 have a pass band 424 extending up to frequency $f_{BBC}$, a transition band 427 extending to frequency $f_{DDC}$, and a stop band 428 extending upward from frequency $f_{DDC}$. Preferably, the frequency $f_{BBC}$ is selected to be at the frequency $f_{BC}$, to pass the baseband of the original chrominance signals substantially without attenuation. The frequency $f_{DDC}$ is selected to be substantially above $f_{BBC}$, to provide the filters 218-219 with a gentle cut-off, but low enough so that, even though the diagonal information replicated spectrum 414 lies in the transition band 427 of the filters 218 and 219, it becomes sufficiently attenuated so as to become invisible in the image.

Again alternatively, if the depth of combing of the comb filters 215-216 is sufficient, the use of the low-pass filters 218-219 may be eliminated.

Figure 4J:
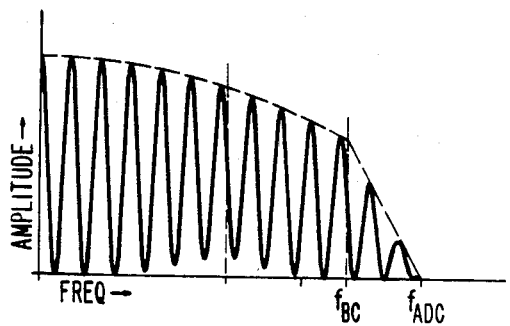

The filtered received chrominance signal, designated in FIG. 1C as (R-Y) and (B-Y), have the spectrum shown in FIG. 4J. This spectrum is substantially a duplicate of the spectrum of the combed bandlimited original chrominance signals, shown in FIG. 4E. The transition band of the spectrum of FIG. 4J extends only to frequency $f_{ADC}$ and not to the frequency $f_{DC}$ of FIG. 4E, the transition band having been attenuated somewhat by the filters 218 and 219.

Having been reconverted substantially to their original form, the received signals Y, (R-Y) and (B-Y) are output on leads 133-135, respectively. The received signals are now suitable for display on a monitor, for recording on a tape, or for other purposes leading to recreation of the original image.

Of course, it should be understood that various changes and modifications to the illustrative embodiment described above will be apparent to those skilled in the art. For example, the system could be used to process and transmit other types of video signals, for example R-G-B color video component signals which require the same processing as the Y signals, or the signals of multiplexed analog components (MAC) systems that have only one "line-sequential" chroma signal and transmit all chrominance information on a single channel. To further reduce the transmission rate, the luminance signal could also be combed at the transmitter and sampled at a weighted sub-Nyquist frequency. Furthermore, the order of the comb and band-pass filters at either or both the transmitted and the receiver could be reversed, such that signals would first be band-limited and then combed. These and other changes and modifications can be made without departing from the spirit and scope of the invention and without diminishing its attendant advantages. It is therefore intended that such changes and modifications be covered by the following claims.

What is claimed is:

1. A video communications system for digitizing and communicating analog component color video signals having a predetermined horizontal rate $f_H$, comprising:

first filter means responsive to receipt of a first analog signal for filtering the first analog signal, including first low-pass filter means for bandlimiting the first analog signal to a pass band and to a transition band, and first high-band comb filter means, coupled to the first low-pass filter means, for removing from the first analog signal frequency components at and about odd multiples of one-half $f_H$;

first sampler means coupled to the first filter means for pulse-amplitude sampling the bandlimited and comb-filtered first analog signal at a first frequency $f_{SC}$ that is a weighted sub-Nyquist frequency of the bandlimited first analog signal and that is an odd multiple of one-half $f_H$; and first digitizer means coupled to the first sampler means for converting each first analog signal sample pulse amplitude into a first digital signal.

2. The system of claim 2 wherein the first low-pass filter means comprise first sharp cut-off low-pass filter means for bandlimiting the first analog signal to a pass band and to a narrow transition band; and wherein the first filter means further comprise phase equalizer means for imposing on the first analog signal a linear phase shift characteristic.

3. The system of claim 1 wherein the first low-pass filter means comprise first low-pass filter means for bandlimiting the first analog signal to a pass band having an upper frequency band $f_{BC}$, and to a transition band; and wherein the first high-band comb filter means comprise high-band comb filter means having a comb band lower frequency bound $f_{OC}$ such that $F_{OC}$ is no higher than $F_{SC}-f_{BC}$.

4. The system of claim 3 wherein the first low-pass filter means comprise first sharp cut-off low-pass filter means for bandlimiting the first analog signal; wherein the first high-band comb filter means comprise first sharp cut-off high-band comb filter means for removing from the first analog signal the frequency components; and wherein the first filter means further comprise phase equalizer means for imposing on the first analog signal a linear phase shift characteristic.

5. The system of claim 4 wherein the first analog signal comprises a chrominance signal.

6. The system of claim 3 wherein the first analog signal comprises a chrominance signal, the system further comprising:

second filter means responsive to receipt of an analog luminance signal for filtering the luminance signal including second low-pass filter means for bandlimiting the luminance signal to a pass band and to a transition band;

second sampler means coupled to the second low-pass filter means for pulse-amplitude sampling the bandlimited luminance signal at a second frequency $f_{SL}$ that is a super-Nyquist frequency of the bandlimited luminance signal and that is an odd multiple of one-half $f_H$;

second digitizer means coupled to the second sampler means for converting each luminance signal sample pulse amplitude into a digital luminance signal; and means coupled to the first and second digitizer means for communicating the digital chrominance and luminance signals.

7. The system of claim 6 wherein the second low-pass filter means comprise:

second sharp cut-off low-pass filter means for bandlimiting the luminance signal; and wherein the second filter means further comprise phase equalizer means for imposing on the luminance signal a linear phase shift characteristic.

8. The system of claim 6 wherein the pass band of the luminance signal is twice the pass band of the chrominance signal.

9. The system of claim 8 wherein the pass band of the luminance signal has an upper frequency bound of 4.2 MHz.

10. The system of claim 9 wherein $f_{SL}$ substantially equals $3f_{SC}$.

11. A video communications system for communicating and converting from digital to analog form component color video signals having a predetermined horizontal rate $f_H$, comprising:

first digital-to-analog converter means responsive to receipt of a digitized first analog signal for converting the received first signal into a first analog component color video signal having a baseband energy spectrum with a pass-band and with a transition band that extends up to a frequency $f_{DC}$, and also having an aliasing energy spectrum with a pass band that extends down to a frequency $(f_{SC}-f_{BC})$ and with a transition band that extends down to a frequency $(f_{SC}-f_{DC})$ such that $(f_{SC}-f_{DC}) < f_{DC}$ whereby the aliasing spectrum is interleaved into the baseband spectrum, the baseband spectrum having energy nulls at and about odd multiples of one-half $f_H$ and the aliasing spectrum having energy nulls at and about integral multiples of $f_H$; and first filter means coupled to the first converter means and including first gentle cut-off high-band comb filter means having a transition band extending at least down to $(f_{SC}-f_{DC})$ and having a combing band extending at least down to $(f_{SC}-f_{BC})$ for removing from the first analog signal frequency components at and about odd multiples of one-half $f_H$.

12. The system of claim 11 wherein the first signal baseband energy spectrum has a pass band that extends up to a frequency $f_{BC}$, and wherein the first filter means further comprise:

first gentle cut-off low-pass filter means coupled to the first comb filter means for bandlimiting the first analog signal to a pass band having an upper frequency bound $f_{BC}$.

13. The system of claim 11 wherein $(f_{SC}-f_{BC})$ BBC > $f_{BC}$.

14. The system of claim 11 wherein the pass band of the second signal is twice the pass band of the first signal.

15. The system of claim 14 wherein the pass band of the first signal has an upper frequency bound of 4.2 MHz.

16. The system of claim 11 further comprising:

means, coupled to the first converter means, for receiving communicated digitized first and second component color video signals;

second digital-to-analog converter means coupled to the receiving means and responsive to receipt of a second digitized component color video signal for converting the received second signal into a second analog component color video signal having a baseband energy spectrum with a pass band that extends up to a frequency $f_{BL}$ and with a transition band that extends up to a frequency $f_{DL}$ and having an aliasing energy spectrum with a transition band that extends down to a frequency $(f_{SL}-f_{DL})$ such that $(f_{SL}-f_{DL}) > f_{DL}$, whereby the aliasing spectrum is not interleaved into the baseband spectrum, the baseband spectrum having energy nulls at and about odd multiples of one-half $f_H$ and the aliasing spectrum having energy nulls at and about integral multiples $f_H$; and second filter means coupled to the second converter means and including second gentle cut-off high-band comb filter means having a combing band above $f_{BL}$ for removing from the second analog signal frequency components at and about odd multiples of one-half $f_H$.

17. The system of claim 16 wherein the second filter means further comprise:

second gentle cut-off low-pass filter means coupled to the second comb filter means for bandlimiting the second analog signal to a pass band having an upper frequency bound $f_{BL}$.

18. The system of claim 16 wherein the first analog singal is a chrominance signal and wherein the second analog signal is a luminance signal.

19. A video communiciations system for digitizing and communicating analog component color video signals having a predetermined horizontal rate $f_H$, comprising:

first filter means responsive to receipt of an analog luminance signal for filtering the analog luminance signal, including a first low-pass filter for bandlimiting the luminance signal to a pass band having an upper frequency bound $f_{BL}$, add to a transition band having an upper frequency bound $f_{DL}$;

second filter means responsive to receipt of an analog chrominance signal for filtering the analog chrominance signal, including a second low-pass filter for bandlimiting the chrominance signal to a pass band having an upper frequency bound $f_{BC}$ that is substantially equal to one-half $f_{BL}$, and to a transition band having an upper frequency bound $f_{DC}$, and a first high-band comb filter coupled to the second low-pass filter for removing from the chrominance signal frequency components at and about odd multiples of one-half $f_H$ while passing frequency components at and about integer multiples of $f_H$;

a first sampler coupled to the first filter means for pulse-amplitude sampling the bandlimited luminance signal at a first frequency $f_{SL}$ that is an odd multiple of one-half $f_H$ such that $f_{SL}-f_{DL}>f_{DL}$;

a second sampler coupled to the second filter means for pulse-amplitude sampling the bandlimited and comb-filtered chrominance signal at a second frequency $f_{SC}$ that is an odd multiple of one-half $f_H$ such that $f_{SC}-f_{DC}<f_{DC}$;

a first digitizer coupled to the first sampler for converting each luminance sample pulse amplitude into a digital luminance signal;

a second digitizer coupled to the second sampler for converting each chrominance signal sample pulse amplitude into a digital chrominance signal; and means coupled to the first and second digitizer for communicating the digital chrominance and luminance signals.

20. The system of claim 19 wherein the first high-band comb filter comprises:

a high-band comb filter having a comb band lower frequency bound $f_{OC}$ such that $f_{OC} \leq f_{SC}-f_{BC}$.

21. The system of claim 20 wherein the first low-pass filter is a sharp cut-off filter and the first filter means further comprises a first phase equalizer for imposing on the analog luminance signal a linear phase shift characteristic; and wherein the second low-pass filter and the first high-band comb filter are sharp cut-off filters and the second filter means further comprise a second phase equalizer for imposing on the analog chrominance signal a linear phase shift characteristic.

22. A video communications system for digitizing and communicating analog component color video signals having a predetermined horizontal rate $f_H$, comprising:

first filter means responsive to receipt of an analog luminance signal for filtering the analog luminance signal, including a first low-pass filter for bandlimiting the luminance signal to a pass band having an upper frequency bound $f_{BL}$, and to a transition band having an upper frequency bound $f_{DL}$;

second filter means responsive to receipt of an analog chrominace signal for filtering the analog chrominance signal, including a second low-pass filter for bandlimiting the chrominance signal to a pass band having an upper frequency bound $f_{BC}$ that is substantially equal to one-half $f_{BL}$, and to a transition band having an upper frequency bound $f_{DC}$;

a first sampler coupled to the first filter means for pulse-amplitude sampling the bandlimited luminance signal at a first frequency $f_{SL}$ that is an odd multiple of one-half $f_H$ such that $f_{SL}-f_{DL}>f_{DL}$;

a second sampler coupled to the second filter means for pulse-amplitude sampling the bandlimited chrominance signal at a second frequency $f_{SC}$ that is an odd multiple of one-half $f_H$ such that $f_{SC}-f_{DC}<f_{DC}$;

a first digitizer coupled to the first sampler for converting each luminance sample pulse amplitude into a digital luminance signal;

a second digitizer coupled to the second sampler for converting each chrominance signal sample pulse amplitude into a digital chrominance signal;

means coupled to the first and second digitizer for communicating the digital chrominance and luminace signals;

a first digital-to-analog converter coupled to the communicating means for converting the digital luminance signal into an analog luminance signal;

a second digital-to-analog converter coupled to the communicating means for converting the digital chrominance signal into an analog chrominance signal;

third filter means coupled to the first converter, including a first high-band comb filter having a transition band both extending at most down to $f_{DL}$ and characterized by a gentle cut-off envelope and having a comb band above the transition band, for removing from the analog luminance signal frequency components at and about odd multiples of one-half $f_H$ while passing frequency components at and about integer multiples of $f_H$; and fourth filter means coupled to the second converter, including a second high-band comb filter having a combing band extending at least down to $f_{SC}-f_{BC}$ and having a transition band characterized by a gentle cut-off envelope extending at least down to $f_{SC}-f_{DC}$, for removing from the analog chrominance signal frequency components at and about odd multiples of one-half $f_H$ while passing frequency components at and about integer multiples of $f_H$.

23. The system of claim 22 wherein the third filter means further include a third gentle cut-off low-pass filter for bandlimiting the analog luminance signal to a pass band having an upper frequency bound $f_{BL}$; and wherein the fourth filter means further include a fourth gentle cut-off low-pass filter for bandlimiting the analog chrominance signal to a pass band having an upper frequency bound $f_{BC}$.

24. A video communications system for digitizing and communicating analog component color video signals having a predetermined horizontal line rate $f_H$, comprising:

a first sharp cut-off low-pass filter responsive to receipt of an analog baseband luminance signal for bandlimiting the luminance signal to a pass band bandwidth $f_{BL}$;

a second and a third sharp cut-off low-pass filter, each responsive to receipt of one of first and second analog baseband chrominance signals for bandlimiting the received chrominance signal to a pass band bandwidth $f_{BC}$ that is one-half $f_{BL}$;

a first phase equalizer coupled to the first low-pass filter for imposing on the luminance signal a substantially linear phase shift characteristic;

a second and a third phase equalizer, each coupled to one of the second and third low-pass filters for imposing on one of the first and second chrominance signals a substantially linear phase shift characteristic;

a first and a second high-band comb filter, each coupled to one of the second and third low-pass filters and each both having a transition band characterized by a sharp cut-off envelope and having a comb band lower frequency bound $f_{OC}$, each for removing from one of the first and second analog chrominance signals frequency components at and about odd multiples of one-half $f_H$ while passing frequency components at and about integer multiples $f_H$;

a first sampler coupled to the first low-pass filter for pulse-amplitude sampling the phase-equalized bandlimited luminance signal at a first sampling frequency $f_{SL}$ that is both an odd multiple of one-half $f_H$ and a super-Nyquist frequency of the bandlimited luminance signal, whereby aliasing energy is not interleaved into the bandlimited luminance signal;

a second and a third sampler, each coupled to one of the first and second comb filters for pulse-amplitude sampling one of the phase-equalized bandlimited comb-filtered chrominance signals at a second sampling frequency $f_{SC}$ whose integer multiple substantially equals $f_{SL}$ and that is both an odd multiple of one-half $f_H$ and a weighted sub-Nyquist frequency of the bandlimited chrominance signal such that aliasing energy is interleaved into the bandlimited chrominance signal and such that $f_{SL} - f_{BC} \geq f_{OC}$;

a first digitizer coupled to the first sampler for converting each luminance sample pulse amplitude into a pulse-code-modulated digital luminance signal;

a second and third digitizer each coupled to one of the first and second samplers, for converting each chrominance sample pulse amplitude of one of the sampled first and second chrominance signals into a pulse-code-modulated digital chrominance signal;

a first encoder coupled to the first digitizer for differential-pulse-code-modulation encoding each digital luminance signal into an encoded luminance signal;

a second and a third encoder, each coupled to one of the second and third digitizers for differential-pulse-code-modulation encoding each digital chrominance signal of one of the sampled first and second chrominance signals into an encoded chrominance signal; and a multiplexer coupled to the first, second, and third encoders for multiplexing the encoded luminance and chrominance signals into a single signal stream for transmission.

25. The system of claim 24 wherein the bandlimited luminance signals have a transition band extending to $f_{DL}$ and wherein the bandlimited chrominance signals have a transition band extending to $f_{DC}$, the system further comprising:

a demultiplexer responsive to receipt of the transmitted signal stream for demultiplexing the signal stream into an encoded received luminance signal, an encoded received first chrominance signal, and an encoded received second chrominance signal;

a first decoder coupled to the demultiplexer for differential-pulse-code-modulation decoding the encoded received luminance signal into pulse-code-modulated digital received luminance signals;

a second and a third decoder coupled to the demultiplexer each for differential-pulse-code-modulation decoding one of the encoded received first and second chrominance signals into pulse-code-modulated digital received chrominance signals;

a first digital-to-analog converter coupled to the first decoder for converting the digital received luminance signals into an analog baseband received luminance signal;

a second and a third digital-to-analog converter, each coupled to one of the second and third decoders for converting one of the first and second digital received chrominance signals into an analog baseband received chrominance signal;

a third high-band comb filter coupled to the first digital-to-analog converter and having a transition band characterized by both a gentle cut-off envelope and a lower frequency bound at least $f_{DL}$ and having a comb band with a lower frequency bound at most $f_{SL} - f_{DL}$, for removing from the analog baseband received luminance signal frequency components at and about odd multiples of one-half $f_H$ while passing frequency components at and about integer multiples of $f_H$; and a fourth and a fifth high-band comb filter, each coupled to one of the second and third digital-to-analog converters and each having a transition band characterized by both a gentle cut-off envelope and a lower frequency bound at most $f_{SC} - f_{DC}$ and having a comb band with a lower frequency bound at most $f_{SC} - f_{BC}$, each for removing from one of the bandlimited first and second analog baseband received chrominance signals frequency components at and about odd multiples of $f_H$ while passing frequency components at and about integral multiples of $f_H$.

26. The system of claim 25 further comprising:

a fourth gentle cut-off low pass filter coupled to the third comb filter for bandlimiting the analog baseband received luminance signal to a pass band bandwidth $f_{BL}$; and a fifth and a sixth gentle cut-off low-pass filter, each coupled to one of the fourth and fifth comb filters for bandlimiting one of the first and second analog baseband received chrominance signals to a pass band bandwidth $f_{BC}$.

27. The system of claim 25 wherein $f_{BL}$ is 4.2 MHz.

* * * * *

UNITED STATES PATENT AND TRADEMARK OFFICE
CERTIFICATE OF CORRECTION

PATENT NO.  : 4,672,427
DATED       : June 9, 1987
INVENTOR(S) : Theodore S. Rzeszewski It is certified that error appears in the above-identified patent and that said Letters Patent is hereby corrected as shown below:

Column 16, line 2, "BBC>$f_{BC}$" should read --$f_{SC} - f_{BC} > f_{BC}$--;
Colunm 16, line 53, "add to a" should read --and to a--.

Signed and Sealed this

Tenth Day of November, 1992

Attest:

DOUGLAS B. COMER

*Attesting Officer*     Acting Commissioner of Patents and Trademarks